United States Patent
Neuberger et al.

(10) Patent No.: US 12,276,830 B2
(45) Date of Patent: Apr. 15, 2025

(54) PREFORMS FOR SPECKLE-FREE OUTPUT OPTICAL FIBERS HAVING STRUCTURED SILICA SECTIONS, METHODS OF SUCH PREFORM MANUFACTURE, AND IMPROVED SPECKLE-FREE OUTPUT OPTICAL FIBERS

(71) Applicant: biolitec Unternehmensbeteiligungs III AG, Vienna (AT)

(72) Inventors: Wolfgang Neuberger, Vienna (AT); Andrey Grischenko, Riga (LV)

(73) Assignee: biolitec Holding GmbH & Co KG, Vienna (AT)

( * ) Notice: Subject to any disclaimer, the term of this patent is extended or adjusted under 35 U.S.C. 154(b) by 0 days.

(21) Appl. No.: 17/802,493

(22) PCT Filed: Feb. 25, 2021

(86) PCT No.: PCT/EP2021/054740
§ 371 (c)(1),
(2) Date: Aug. 25, 2022

(87) PCT Pub. No.: WO2021/170748
PCT Pub. Date: Sep. 2, 2021

(65) Prior Publication Data
US 2023/0104707 A1     Apr. 6, 2023

Related U.S. Application Data

(60) Provisional application No. 62/981,151, filed on Feb. 25, 2020.

(51) Int. Cl.
*G02B 6/036* (2006.01)
*C03B 37/014* (2006.01)
(Continued)

(52) U.S. Cl.
CPC .... *G02B 6/03688* (2013.01); *C03B 37/01426* (2013.01); *G02B 6/023* (2013.01);
(Continued)

(58) Field of Classification Search
CPC ................ G02B 6/023; G02B 6/03688; C03B 37/01208; C03B 37/0122
See application file for complete search history.

(56) References Cited

U.S. PATENT DOCUMENTS 4,149,772 A     4/1979   Iyengar et al.
4,494,968 A *   1/1985   Bhagavatula ..... C03B 37/01493
                                                          65/427

(Continued)

FOREIGN PATENT DOCUMENTS

CN      111484242 B   *  7/2021
WO      2017136831 A1   8/2017

OTHER PUBLICATIONS

C. Valentin et al. Top-hat beam output of a single-mode microstructured optical fiber: impact of core index depression. Optics Express, 21:20:23250-23260, Oct. 7, 2013. (https://doi.org/10.1364/OE.21.023250) (Year: 2013).*

(Continued)

*Primary Examiner* — Michael Stahl
(74) *Attorney, Agent, or Firm* — Barclay Damon LLP

(57) ABSTRACT

The production and new type of preforms are presented which yield, upon drawing, new, class of optical fibers, improved, speckle-free output optical fibers. Useful fibers, providing speckle-free, smooth output with flat top transmission of light from gaussian or few mode sources are produced from preforms introduced herein. The unique production of these improved preforms is also presented. The preforms, and thus the fibers produced in varying core dimensions from about 100 μm to above 1000 μm, are based (Continued)

on a structured silica section of mode mixing area adjacent to the inner core, or in the case of non-circular core, within the core. Plasma Vapor Deposition process is modified to achieve the structured sections in a well-controlled manner. The structured sections are composed of a number of pairs of layers, where a thin down-doped layer is alternated with a much thicker core material layer. The ratio of the thickness of the core layer to the thickness of the down-doped layer is about 3 to 25. The number of paired layers is typically between about 8 to 30-layer pairs. The effective NA of the structured section is dependent on the particulars of the structured silica section and of the individual down-doped layer. Both circular inner core examples and non-circular core examples are possible and are discussed, herein.

10 Claims, 6 Drawing Sheets

(51) Int. Cl.
  *G02B 6/02* (2006.01)
  *B08B 7/00* (2006.01)
  *G02B 6/14* (2006.01)

(52) U.S. Cl.
  CPC ......... *B08B 7/0042* (2013.01); *C03B 2201/34* (2013.01); *G02B 6/14* (2013.01)

(56) References Cited

U.S. PATENT DOCUMENTS

| | | | | |
|---|---|---|---|---|
| 5,802,236 | A * | 9/1998 | DiGiovanni | G02B 6/02361 385/127 |
| 6,031,849 | A | 2/2000 | Ball et al. | |
| 7,317,857 | B2 * | 1/2008 | Manyam | G02B 6/02033 385/127 |
| 2003/0031443 | A1 * | 2/2003 | Soljacic | C03C 3/07 65/435 |
| 2004/0247269 | A1 * | 12/2004 | Hirano | G02B 6/03688 385/123 |
| 2007/0009217 | A1 * | 1/2007 | Seifert | C03C 13/046 385/123 |
| 2008/0000269 | A1 * | 1/2008 | Aladenize | C03C 25/475 65/507 |
| 2008/0277565 | A1 * | 11/2008 | Bookbinder | G02B 6/02047 250/206 |
| 2011/0033162 | A1 * | 2/2011 | Simonneau | H01S 3/06708 385/127 |
| 2013/0034322 | A1 * | 2/2013 | Auth | G02B 6/0286 385/124 |
| 2018/0239074 | A1 * | 8/2018 | Rose | A61N 5/06 |
| 2023/0086322 | A1 * | 3/2023 | Skutnik | H01S 3/06733 385/128 |
| 2023/0333339 | A1 * | 10/2023 | Mordarski | B23K 26/082 |

OTHER PUBLICATIONS

J.R. Hayes et al. Square core jacketed air-clad fiber. Optics Express, 14:22:10345-10350, Oct. 30, 2006. (https://doi.org/10.1364/OE.14.010345) (Year: 2006).*

P. Calvet et al. Top-hat beam output from a large mode area microstructured fiber for beam delivery. Proceedings of the SPIE 8433, May 2012. (https://doi.org/10.1117/12.921691) (Year: 2012).*

N.J. Doran et al. Cylindrical Bragg fibers: a design and feasibility study for optical communications. Journal of Lightwave Technology, LT-1, No. 4, Dec. 1983. (https://doi.org/10.1109/JLT.1983.1072171) (Year: 1983).*

F. Kong et al. Flat-top mode from a 50 μm-core Yb-doped leakage channel fiber. Optics Express, 21:26:32371-32376, Dec. 30, 2013. (https://doi.org/10.1364/OE.21.032371) (Year: 2013).*

International Search Report in Application No. PCT/EP2021/054740, dated May 3, 2021.

* cited by examiner

PREFORMS FOR SPECKLE-FREE OUTPUT OPTICAL FIBERS HAVING STRUCTURED SILICA SECTIONS, METHODS OF SUCH PREFORM MANUFACTURE, AND IMPROVED SPECKLE-FREE OUTPUT OPTICAL FIBERS

CROSS-REFERENCE TO RELATED APPLICATIONS

This application is a U.S. national stage application under 35 U.S.C. 371 of co-pending International Application No. PCT/EP2021/054740 filed on Feb. 25, 2021 and entitled PREFORMS FOR SPECKLE-FREE OUTPUT OPTICAL FIBERS HAVING STRUCTURED SILICA SECTIONS, METHODS OF SUCH PREFORM MANUFACTURE, AND IMPROVED SPECKLE-FREE OUTPUT OPTICAL FIBERS, which in turn claims priority to U.S. Provisional Patent Application No. 62/981,151 filed on Feb. 25, 2020, the contents of which are incorporated herein by reference in their entirety for all purposes.

INTRODUCTION

Field of Invention

For many applications employing lasers and fiber lasers, it is preferable to have a speckle-free output, instead of the typical Gaussian distribution available from laser sources, at the distal output end of the fiber system. Such outputs are often called Top Hat or Flat Top distributions. In general, they require efficient mode mixing fiber sections to work well in most systems/applications. In other applications speckle-free output is required to provide speckle-free emission, e.g. for laser cleaning or for spatially sensitive sensors. We disclose here a method of manufacture, and preform structures, which can be drawn into the desired optical fibers having speckle-free output across their output surface.

Background

For a variety of applications, laser welding or joining has become a very large business. In many cases in order to get the full benefits of these processes, it is critical to have a very clean and very smooth surfaces, down to atomic/molecular dimensions. In prepping surfaces for precision welding and long-lasting welding as well as for repainting, etc., laser cleaning has become the method of choice.

The need and therefore quest for speckle-free output fiber output has been present for some time, particularly after laser and fiber laser sources began to be used in many applications. In addition to needs for super clean surfaces for improved welding and joining, the ever-increasing miniaturization of various photo-optical devices, as well as the push for single or few mode sources for high density power have driven the need for speckle-free beams in laser treatment systems of large and small components. Whether they are laser welding, laser cleaning, laser joining/sealing procedures, each can have negative effects with a non-speckle-free beam. For example, rippling in a surface after cleaning with a laser having speckled output, achieving a regular joining but not as intimate, continuous or defect-free as ideal as laser joining/welding can provide. Further, in High Power (CW or Pulsed) sources, local power peaks can lead to the destruction of the fibers, themselves. Avoiding this is very desirable, especially in high power applications Optical fibers are often used to transport and distribute laser radiation to areas away from the laser source. This may be for the benefit of protecting the source, providing a larger working beam, and/or more flexible to reach a varied surface target. Generally, these benefits are due to the use of multimode optical fibers with large cores, having many modes of transmission for the laser energy.

Optical fibers are generally drawn from preforms. The cross-sectional structure of the preform decides the cross-sectional structure of the drawn fiber. The production of preforms can be done by several processes but the one described herein is Plasma Outside Vapor Deposition (POVD). Here the preform is built up from a core rod by depositing sequential layers of materials to provide cladding and glass jacketing. Sometimes after cladding deposition is completed a tube of pure silica is fused over the preform to bring the outer diameter up to the desired thickness. In such processes the core, cladding and outer pure silica are all coaxial with each other. Polygonal shaped core preforms can be produced in a similar manner starting with the non-circular core and depositing cladding and jacket layers as with a circular core. Standard dimensioned optical fibers can be drawn from such preforms with either a circular or non-circular core depending on the shape of the starting material preform.

Laser Joining; high need for speckle-free, cleaned surfaces in electronics and high-tech miniaturizations. Mode mixing fiber not always leading to true flat top output, creation or leaving behind ripples on surface at molecular scale whose effects actually damage/compromise behavior of devices or high technology apps like supersonic jets, high value aircraft parts, space applications, etc. The smaller the devices, the more desirous is high speckle-freeity of the beam output across the output surface areas of the delivery fiber. Otherwise serious negative effects may arise across the surface of the treated pieces. The mode mixing needed to have effectively cladding pumped fiber laser is relatively undemanding compared to the needs of laser processing in miniature to subminiature electronic devices, for example. Merely asymmetric cores or non-circular cores are not adequate for the levels of mixing needed to produce genuine top hat outputs which are truly speckle-free output across a large range of input sources.

As a result, what is needed for many of the critical applications in laser cleaning, laser joining, and laser welding is an optical fiber with excellent mode mixing to achieve speckle-free output. Ideally such an optical fiber is simply drawn from a properly constructed preform having all the necessary features of the final optical fiber in proportion to the draw-down ratio of the required size of the optical fiber.

In the prior art there have been several approaches taken to create non-symmetric core cross-sections by using asymmetric cores, non-circular cores, claddings containing disruptive changes in refractive index by adding local sections of a new material or air, and varying the cross-section at different spots along the long axis of the optical fiber over length by modifying draw parameters during the drawing process.

OBJECTIVES AND SUMMARY OF THE INVENTION

Our technological advancement in preform structures improves likelihood of better, more speckle-free performance of remote processes requiring optical fibers, drawn from preforms, herein described, as well as novel manufacturing techniques to achieve and deliver the required speckle-free output properties in fibers drawn from these preforms. A major objective is to design and prepare optical preforms with structures inherently better (ideally) suited to allow the drawing of optical fibers of various sizes which are speckle-free output in transmission of gaussian output sources or other sources without speckle-free cross-sectional output.

Another objective is to provide preforms for speckle-free output optical fibers which can be drawn into speckle-free output fibers using standard drawing processing, thus permitting no loss in output from the drawing process and keeping additional costs within only the preform production process.

Another objective is to provide manufacturing processes for preforms, which can be used to prepare speckle-free output optical fibers.

A further objective is to provide speckle-free output optical fibers for various laser processing of materials, including laser cleaning, laser machining and laser welding.

Circular core preform structures which satisfy these objectives are the goal of the current patent. Production and processing of non-circular core preform structures which can also be successfully drawn into speckle-free output optical fibers are also among the goals of this patent application.

In summary, we describe new types of circular core; and non-circular core preforms for drawing speckle-free output optical fibers of equivalent cross-section; and their methods of manufacture. These preforms are designed to produce better speckle-free output optical fibers. Fibers of varying dimensions, having core sizes from 100 µm to 1000 µm and above, that effectively transform gaussian or low mode optical source output into speckle-free working surface output, such as flat top output. The new, improved speckle-free output optical fibers products, made from these preforms, are excellent for use in laser machining applications, including laser cleaning of surfaces and laser welding of critical surfaces as well other applications benefitting from top hat type output.

DETAILED DESCRIPTION OF PREFERRED EMBODIMENTS

Figure 1:
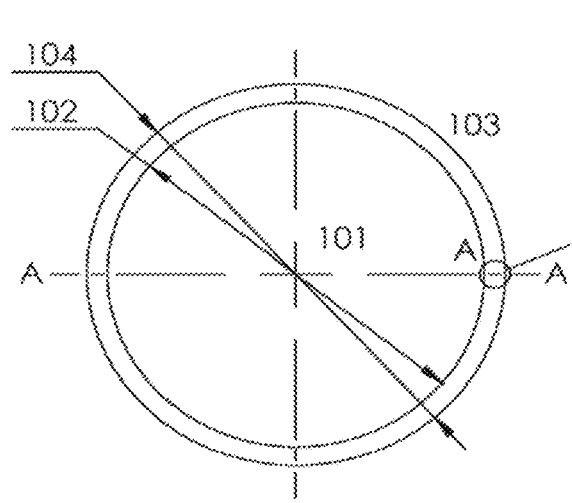
FIG. 1 shows the basic structure of an initial preform, with a core and surrounded by structured silica layers as seen in FIG. 1A.

In the descriptions following below, features illustrated in the FIGS. 1 through 8, numbers with the same last two digits are similar items, so for example 101, 201, 301, 401 . . . etc. are pure silica cores, which comprise inner cores and each of 103, 203, 303, 403, 503 . . . etc. are a structured silica mode mixing areas built up from down-doped silica and pure silica depositions, as described below, which surround, in each case, the inner core across the Figures. While the majority of depositions described herein used the plasma outside vapor deposition (POVD) process, if desired for the usual reasons, the plasma chemical vapor deposition (PCVD) process can also be used in different deposition steps described herein. Reference to plasma deposition, herein, can refer to either process if not specified. A pure silica core rod 101 has been placed in a POVD chamber to add a series of layers alternating between down-doped layer 123 and pure silica layer 121 leading to the structured section 103 seen in FIG. 1. The difference between the diameter of the pure silica core 102 and the diameter of the structured silica section 104 defines the overall thickness of mode-mixing, structured silica section 103. Within section 103, there are a number of layered pairs 120 which can be different for different cases, generally being in the range of 8 to 30 pairs. Within each layered pair 120, layer 121 of pure silica is often much thicker than layer 123 of down-doped silica. The range for the ratio of the two thicknesses is generally about 1 to 20. This is summarized in FIGS. 1 and 1A. Particularly useful ranges of these two parameters are 7-13 for the thickness ratio within paired layers, and 12-20 for the number of paired layers.

As a matter of course, to start with a silica core of the proper size, the inner core 101, 201, may be fabricated from a thinner silica rod onto which pure silica is deposited by the plasma deposition of additional pure silica to achieve the desired core diameter in some cases.

Figure 2:
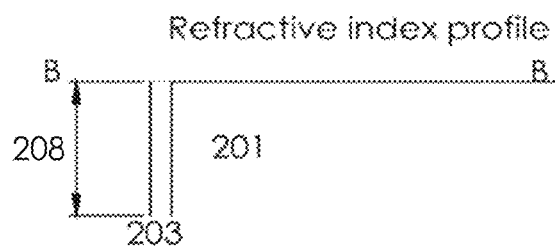
FIG. 2 illustrates the refractive index profile at a cross section of the initial preform, with additional details in FIGS. 2A and 2B.
Figure 2A:
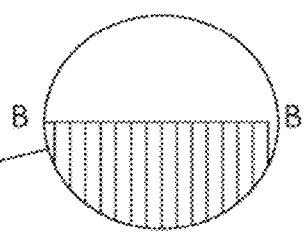
Figure 2B:
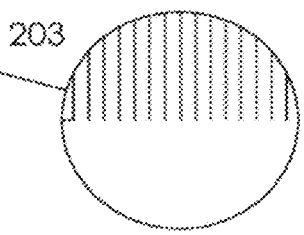

FIG. 2 illustrates a Refractive Index (RI) profile for preform 100 in cross-section. FIGS. 2A and 2B show how the RI changes across the cross-section. The lines represent the drop in refractive index for the down-doped silica layers between the refractive index of the core material 208. The sharpness of the change in RI demonstrates the sharp change in material during deposition, and the speckle-free bottoms establish the speckle-freeness of the dopant level in each down-doped layer. In one series of examples, the $\Delta n = 5 \times 10^{-3}$.

Figure 1A:
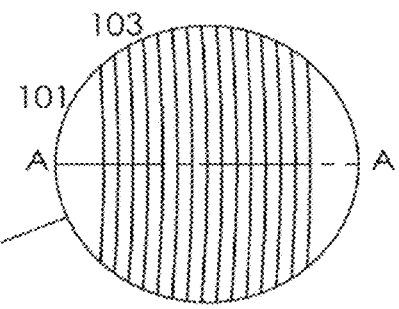
Figure 3:
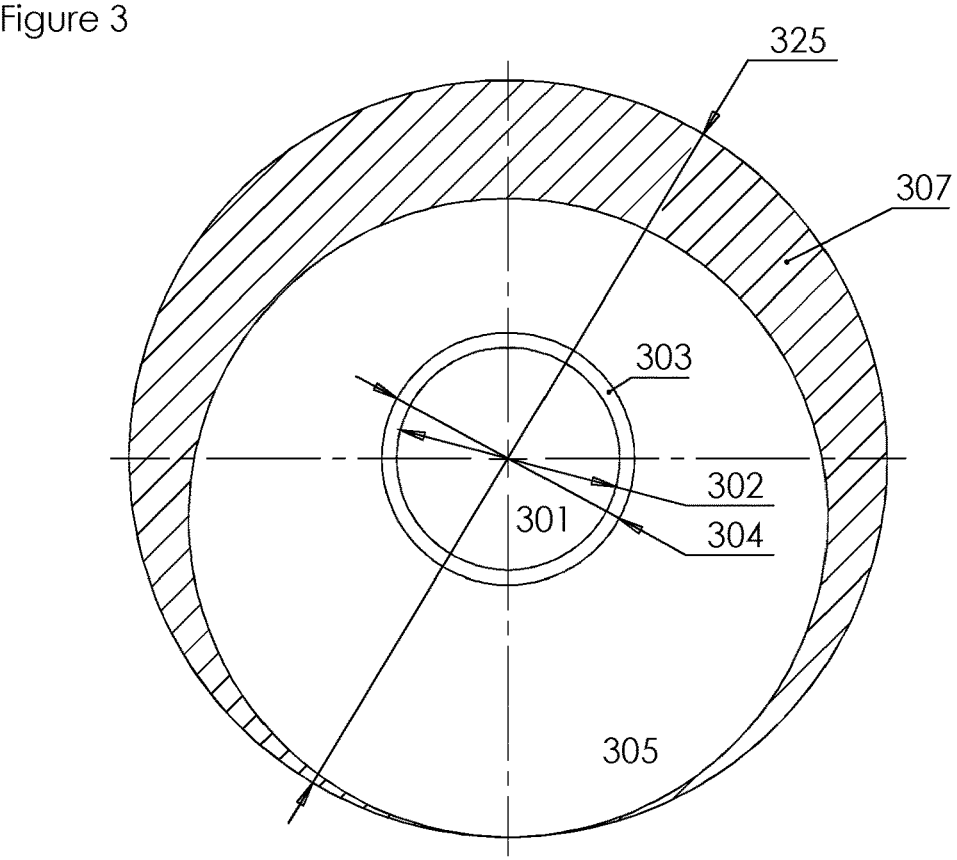
FIG. 3 shows an intermediate preform, where the shaded, asymmetrical area has been ground away. Making the inner core asymmetric to the resulting preform, as illustrated in FIG. 4

After taking the preliminary form in FIG. 1, it is deposited with additional pure silica 305 to create the preform, depicted in FIG. 3, with diameter 325. In the next step a preform with an asymmetric inner core is fabricated by grinding away portion 307 of initial preform diameter 325, preferentially to one side of the preform, so that the new preform shape has structured silica section 303 surrounding inner core 301, offset from the center of the newly ground shape.

FIG. 3 depicts the removal of outer material 307, asymmetrically, wherein inner core 301 is off center within outer core 305. Core 301 is concentrically surrounded by the structured silica area 303, with the diameter 302 of the inner core and diameter 304 of the structured silica, defining the overall thickness of the latter's area.

Figure 4:
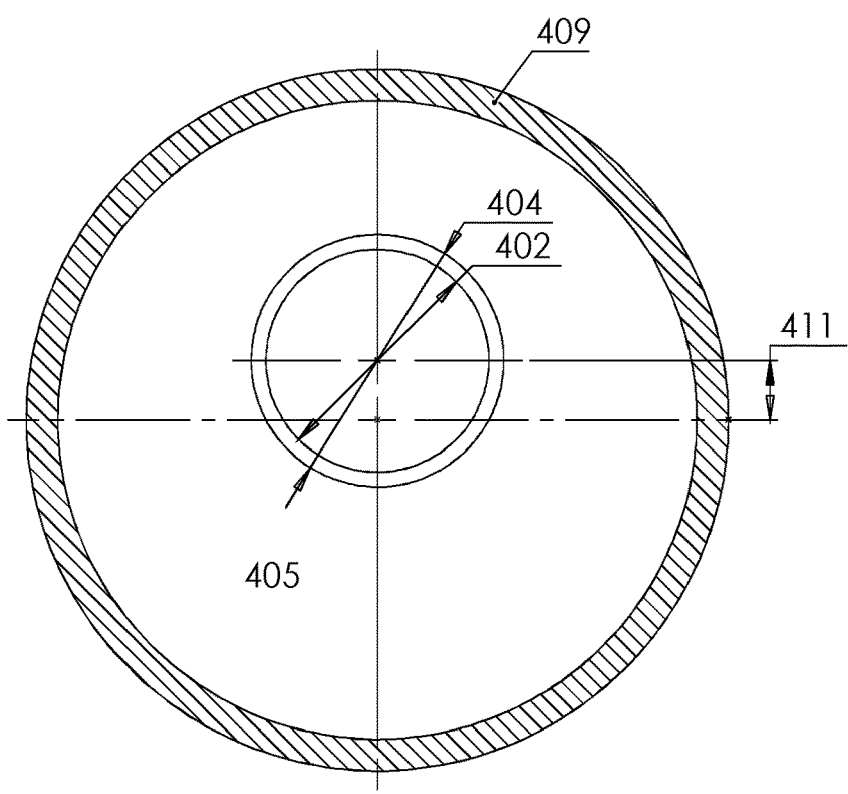
FIG. 4 illustrates an internal intermediate preform from FIG. 3, surrounded by a reflective layer, which is ready to draw speckle-free output, optical fibers.

FIG. 4 shows a cross-sectional view of the finished preform ready for drawing into optical fiber with speckle-free output. Inner core 401 is concentrically surrounded by structured silica 403 with thickness defined by the difference in diameter of structured silica 404 and of the inner core 402. Outermost core 405 is surrounded by reflective layer 409 such as POVD/PCVD deposited down-doped silica. Note that the center of inner core 401 is offset in outer core 405 by difference 411. In one example 411 was 4 mm.

We can also use FIG. 4 to first illustrate the cross-section of an optical fiber drawn from the preform, described above. In this case, reflective layer 409, can be applied as the optical fiber is drawn, and thus may be selected from silicone, hard plastic cladding, other polymeric cladding material. Reflective layer 409 of a speckle-free output optical fiber may also be compound, i.e. the fiber can be drawn with a reflective layer on the preform and an added reflective layer during the drawing process.

One other point should be added. While silica glass fibers are very strong as drawn, over time the glass surface is prone to damage from various conditions in applications, which can compromise the outermost glassy layer. As such, it is well known that generally optical fibers used in open environments, as found in most industrial or medical applications, generally have one or more protective outer coatings (jacket) not depicted herein. These outer coatings are usually applied during the draw process, but they can be applied in further downstream processing.

FIG. 5 through 8 exemplify aspects of creating preforms and optical fibers for speckle-free output, having non-circular cores. First an initial preform as depicted in FIG. 1 is enlarged with additional core material to make a larger preform with diameter 525 with inner core 501, structured silica area 503, and a second core around the structured silica area. The second core can be prepared by a plasma deposition process entirely, or alternatively by sleeving a pure silica tube, whose inner dimension is a close fit for the diameter of the initial preform, and then bonding the two into a larger preform, free of bubbles, having desired diameter 525. The larger preform is ground removing material 507 until its width 515 is achieved, with a specific height that is related to its width. The larger preform is ground such that a portion of the second core material is maintained over all structured silica area 503. For most examples inner core 501 and outer (second) core 505 are both pure silica material. The ground preform is cut along cutting line 513 to create two non-circular cores of two new preforms; each of which can be drawn into speckle-free output optical fibers.

Figure 5:
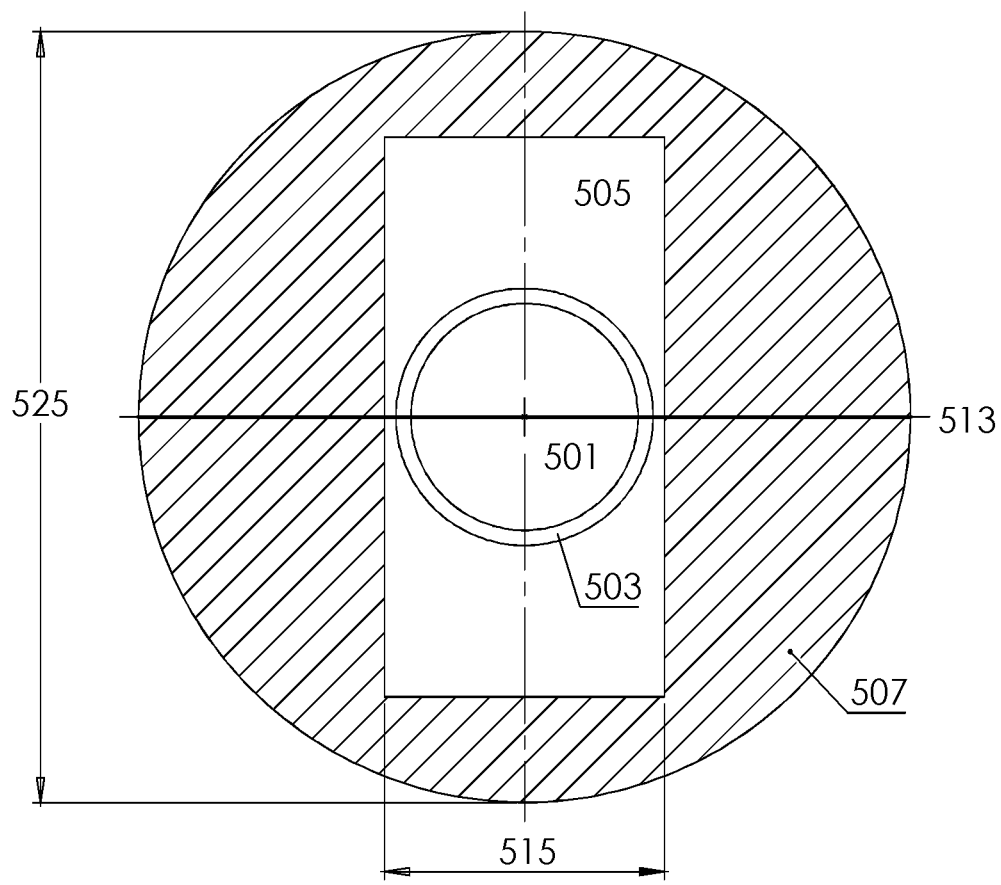
FIG. 5 shows a preliminary stage of an intermediate preform for non-circular core optical fibers, in relation of the initial preform in FIG. 1.
Figure 6:
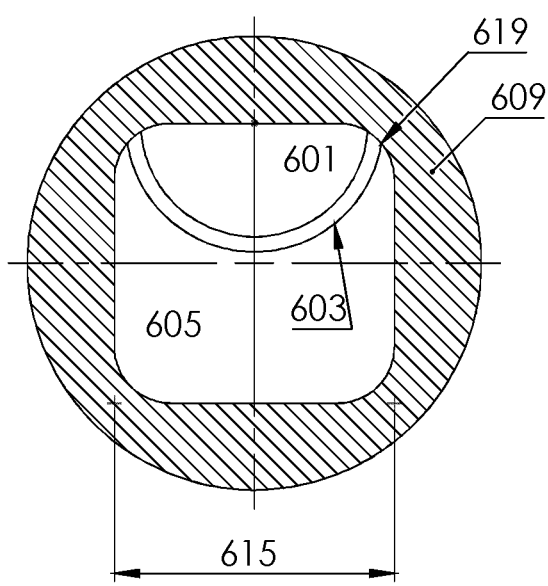
FIG. 6 illustrates one of the 2 preforms produced from the intermediate preform shown in FIG. 5, which is ready to draw in non-circular core, speckle-free output optical fibers.

In FIG. 6, each complex core from FIG. 5 is setup in a plasma deposition apparatus, after rounding off its corners 619, reflective coating 609 is deposited onto the complex non-circular core. Core material 601 and 605 are generally the same, and the core has semicircular area 603 of structured silica within it. Its width 615 is as shown. In this particular example the width and height are essentially equal in length, and the non-circular core is square in shape. Other shapes are possible, such as rectangular, trigonal, trapezoidal, hexagonal, octagonal, etc.

Optical fibers drawn from this preform will have an equivalent cross section with actual sizes proportional to the preform. In one preform example, diameter of inner core 501 was 15 mm. that of structured silica 503 was 17 mm, making the thickness of structured silica 503, 603, 2 mm. The width and height are equal at 18.5 mm. and preform diameter 525 was 51 mm.

Figure 7:
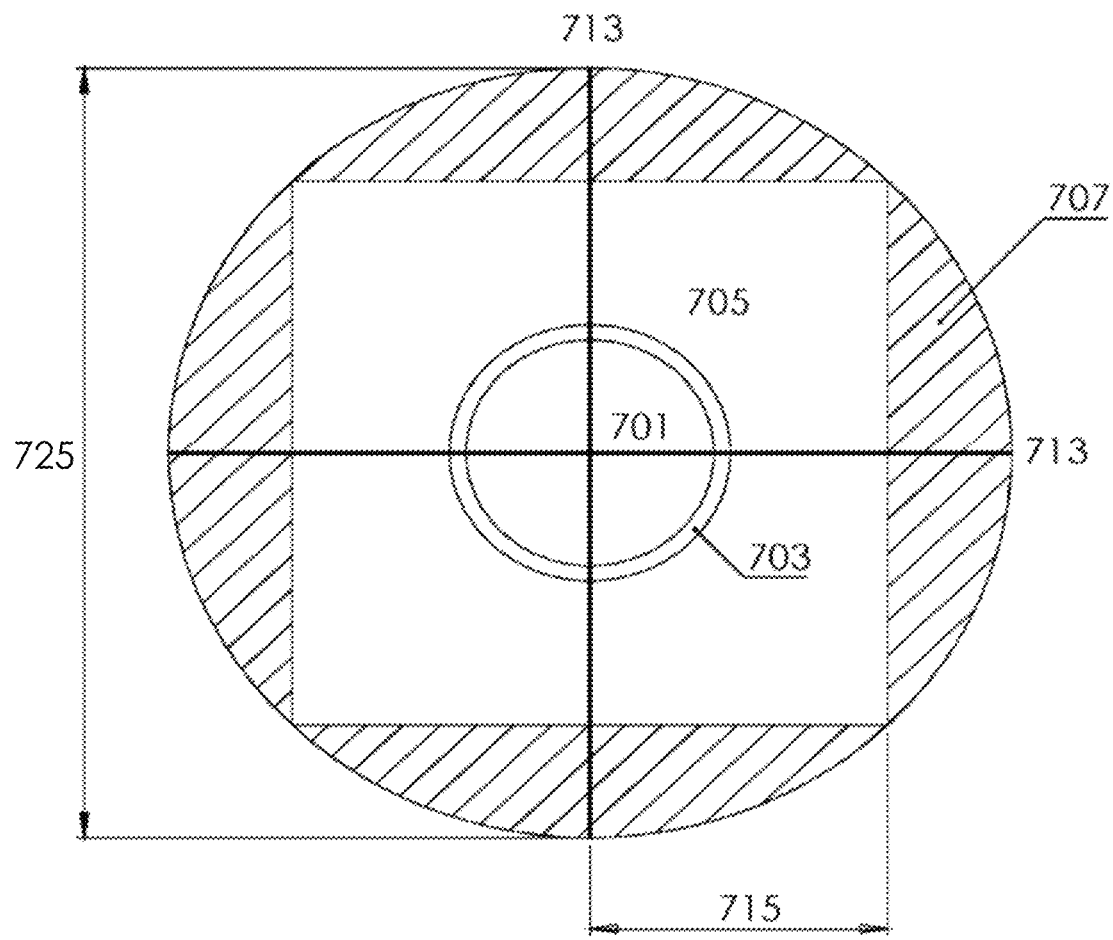
FIG. 7 basically shows the preform, having flat surfaces and two sets of cutting lines to create cores for 4 drawing preforms with non-circular cores.
Figure 8:
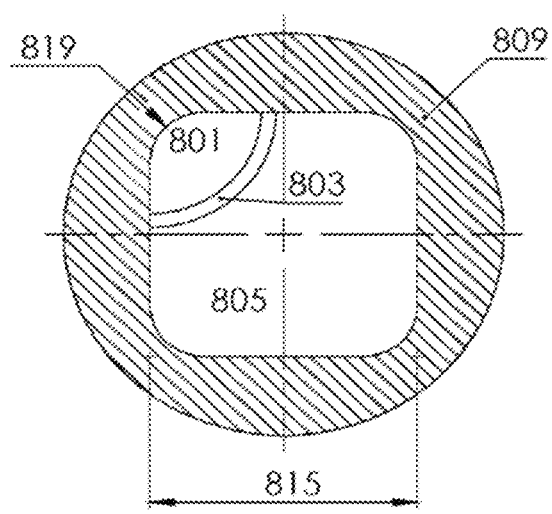
FIG. 8 illustrates one of the 4 preforms produced from the initial preform in FIG. 7, which is ready to draw into non-circular core, speckle-free output optical fibers.

FIGS. 7 and 8 depict splitting a ground initial preform with a non-circular core into 4 equivalent square cores and creating 4 novel preforms having a cross section as shown in FIG. 8. Thus, in FIG. 7, inner core 701 is surrounded by structured silica 703 which is then surrounded by additional core material 705. The initial preform has diameter 725. After initial depositions, the preform is ground to an oblong complex core by removing material 707 and then cutting the resulting oblong core along cutting lines 713 into 4 non-circular core pieces, which have side dimensions 735. These pieces are then rounded on the corners and deposited with a reflective layer 709, making 4 similar preforms as depicted in FIG. 8. As before inner core 701 and second core 705 are generally the same material, most likely pure silica.

As shown in FIG. 8, the final preform has an arc of structured silica 803 sandwiched between core material 801 and core material 805 within a square core, for this example with rounded corners 819, reflective material 809, surrounding said core, is deposited or otherwise added creating the final preform. Width of said non-circular core 835 is equal to said core's height, since in this example the core is square. Other possible shapes of the non-circular core are noted above. The relative areas in the optical fibers, as drawn, will be proportional to those of the preform depicted in FIG. 8, since the fiber cross section will be equivalent in shape to that of the preform.

In an example, the diameter of pure silica inner core 701 was 15 mm and that of surrounding structured silica 703 was 17 mm making the thickness of structured silica 703, 803 be 2 mm. Diameter 725 was 51 mm. Each of the 4 non-circular core had side dimensions 735, 835 of 18.5 mm×18.5 mm.

Figure 9:
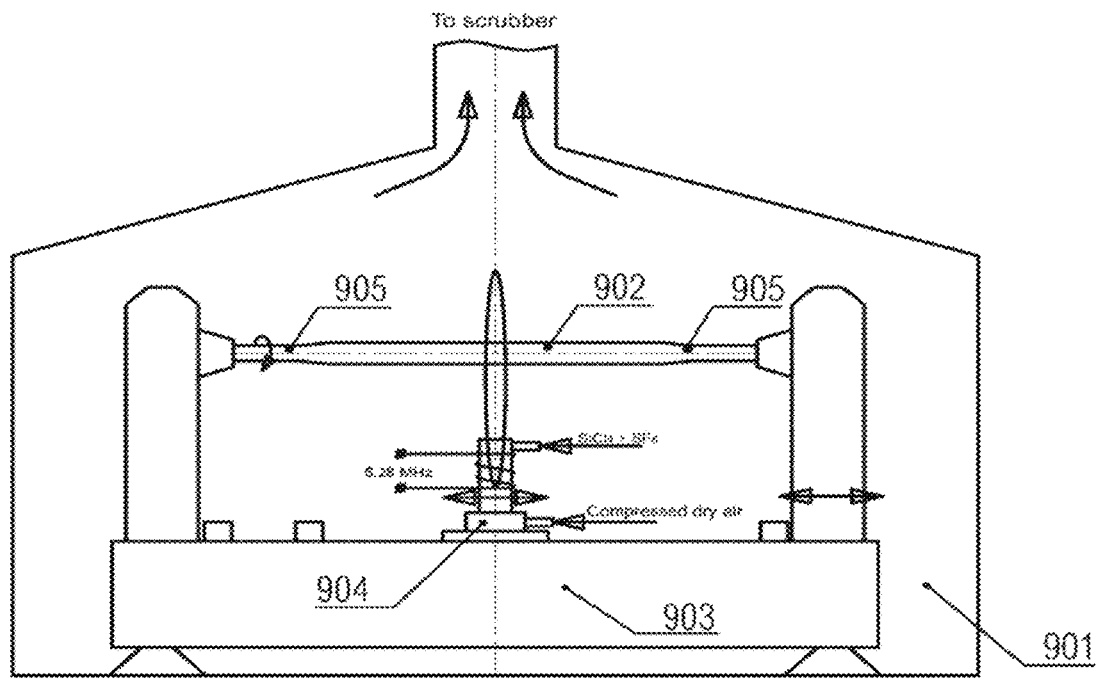
FIG. 9 depicts a cross sectional view of a Plasma Outside Vapor Deposition (POVD).

A typical POVD set-up is illustrated in FIG. 9, where 901 is the screening box; 902 is a substrate rod; 903 is a glass-working lathe; 904 is a plasma torch; and 905 are the handles attached to substrate rod 902. In many examples, plasma torch 904 operates at 5.28 MHz and 50 kW power levels. As noted earlier either plasma vapor deposition in different cases, i.e. POVD or PCVD.

The range of materials that can be used as core material, within structured silica sections and reflective coatings are many. Often pure silica is chosen as the core material and for sleeving, but an up-doped Si, such as Germanium-doped Si (Ge—Si) or a graded index silica-based core, can be used. The reflective layer, most often is a fluorosilicate, but other lower index silicas such as borosilicates could be used. Among reflective/cladding-type coatings, applied after fiber drawing include fluoroacrylate and silicone plastic materials. The choice of core material will affect the viable choices of materials for the paired layers of the structured silica sections. For example, using pure silica as the core material, a down-doped (lower RI) silica would be the first layer in the paired layers, such a Fluorosilica with a selected F dopant level, and the second, higher RI, layer could be selected from; a pure silica, or a lesser doped Fluorosilica, or an up-doped silica such as Ge—Si, or similar materials, as long as the aggregate index of refraction of the structured silica section was lower than the core refractive index, as required for optical fibers Some special effects could arise where one or more of either layer in the pairs was changed to an up-doped silica, as long as the refractive index of the structured silica section remained lower than the core refractive index.

Preferred combinations, thickness ratios within paired layers, and number of paired layers, are many, being dependent on the intended application, the preform equipment and materials available, and core requirements. Some of the more useful ranges for number of layers and thickness ratio between the layers within a paired layer have been described earlier.

Separately, to produce a fiber laser or amplifier, a rare-earth doped innermost core could be incorporated in a structure of silica or other core material, in a preform and thus in the drawn optical fiber, and adding the structured silica, etc. structure. Alternatively, a tube type preform could be manufactured and then sleeved over the rare-earth core or a clad rare-earth core rod.

Figure 10:
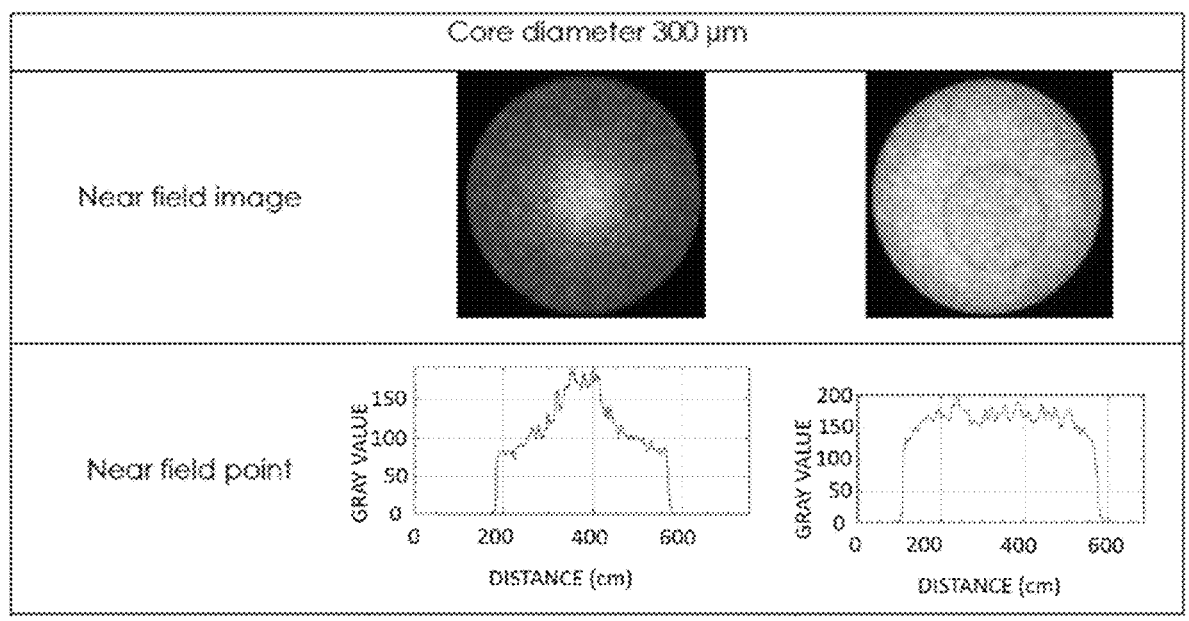
FIG. 10 has, on the right, the Near Field Image and Plot for a circular core optical fiber of the present invention with a 300 µm core diameter; and on the left the Near Field Image and Plot for a prior art, standard circular core optical fiber with a 300 µm core diameter.
Figure 11:
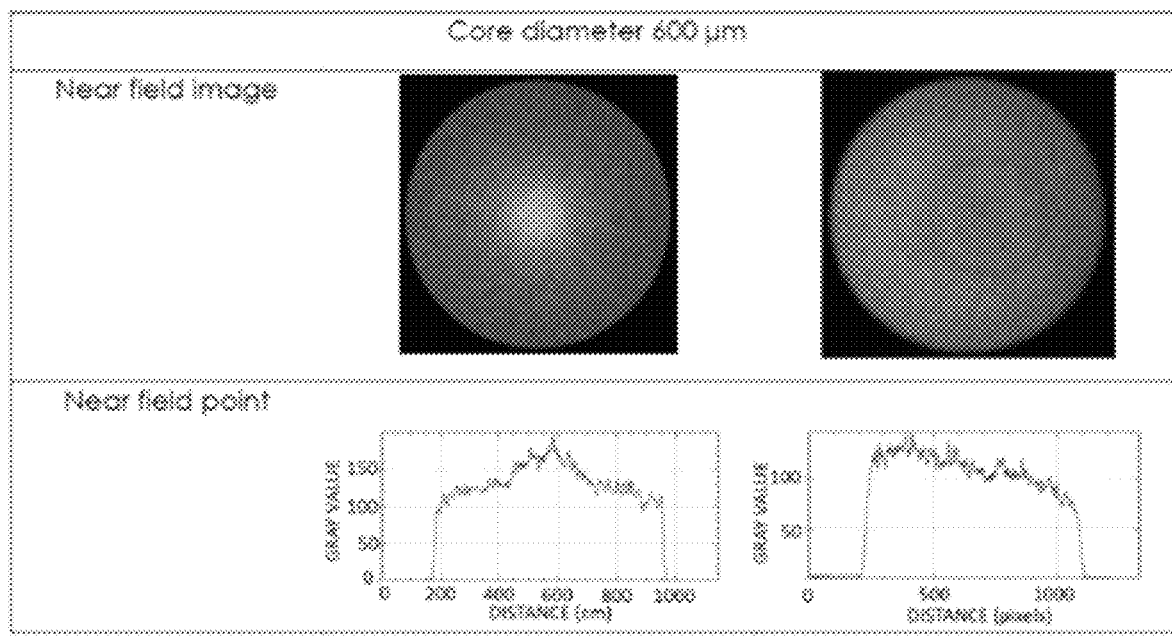
FIG. 11 has, on the right, the Near Field Image and Plot for a circular core optical fiber of the present invention with a 600 µm core diameter; and, on the left, the Near Field Image and Plot for a prior art, standard circular core optical fiber with a 600 µm core diameter.
Figure 12:
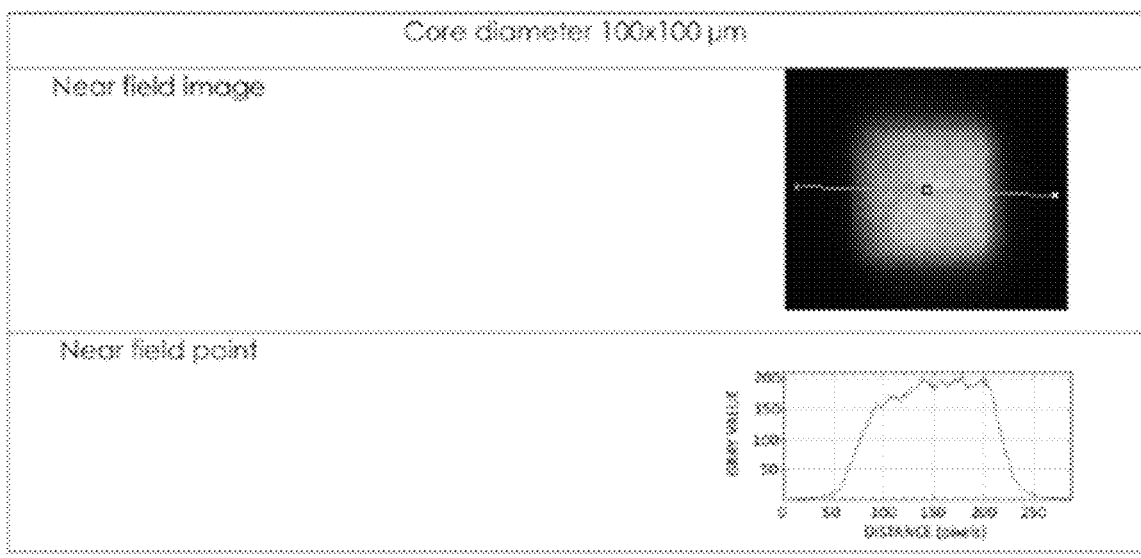
FIG. 12 has, on the right, the Near Field Image and Plot for a non-circular core optical fiber of the present invention with 100 µm×100 µm core dimensions.

FIGS. 10-12 present some representative results for fibers made from preforms having structured silica sections, contained within their cores. In particular each figure has, on the right, a Near Field image and below a corresponding output plot for three sample fibers having 300 µm; 600 µm; circular core and a noncircular, square core, 100 µm×100 µm; respectively. For comparison, in FIGS. 10 and 11, on the left half show corresponding Near Field Images and Plots for standard 300 µm and 600 µm core optical fibers, respectively.

At the time of filing, 300 µm core, 600 µm core or larger core fibers would be among the preferred examples of invention. For non-circular core fibers, preferred non-circular core versions would be either a square or rectangular core with a semicircular arc of structured silica, or with a quarter circle arc segment of structured silica.

An additional possibly useful configuration would have a thin up-doped layer either preceding or following the structured silica sections described above; or thin up-doped layers before and after the structured silica sections described earlier here. The thickness of this up-doped layer ought to be as thin or thinner than the lower RI layer of the paired layers.

The invention claimed is:

1. A preform for speckle-free output optical fibers, drawn from it, whose cross-sectional structure comprises: a complex core structure and a reflective layer, the complex core structure comprising a circular inner core with a refractive index and a circular outer core with the same refractive index as the inner core, the inner core surrounded by a structured circular area with an average refractive index lower than the refractive index of the inner core and the outer core.

2. The preform according to claim 1, wherein said structured circular area has a number of paired layers starting from the inner core with a first layer having a lower refractive index (RI) than the inner core material, followed by a next layer having a higher RI than the first layer material, and where each layer has a thickness.

3. The preform according to claim 2, wherein said lower RI layer is a down-doped layer and said next layer is a layer of the same material as the circular inner core, or an up-doped layer.

4. The preform according to claim 3, wherein a ratio of the thickness of the layer of the same material as the circular inner core to the thickness of the down doped layer, in each of said paired layers, is about 1 to about 20.

5. The preform according to claim 2, wherein the number of said paired layers is about 8 to about 30.

6. The preform according to claim 1, wherein a tube of pure silica is collapsed onto it without creating any gaps or any bubbles at an interface between an internal surface of said tube and the reflective layer, forming a drawing preform for the speckle-free output optical fiber.

7. The preform according to claim 1, wherein said preform is used to form an optical fiber whose cross-section is proportional to that of said preform, and whose output/transmission is speckle-free output.

8. A method of manufacture of the preform, according to claim 1, wherein plasma vapor deposition is used to produce one or more sections and their layers of the cross-sectional structure as described in claim 1.

9. The preform according to claim 1, which further comprises an innermost core of high refractive index, rare earth doped material, so that upon drawing, the optical fiber can be used as an optical fiber laser/amplifier or sensing medium.

10. The optical fiber according to claim 7, in which the associated preform has an innermost core of rare-earth doped material, so that the fiber can function as a fiber laser/amplifier or for sensing purposes.

* * * * *